United States Patent [19]

Swars

[11] Patent Number: 5,618,462
[45] Date of Patent: Apr. 8, 1997

[54] ELECTRICALLY INSULATING, GAS-TIGHT LEADTHROUGH FOR AT LEAST ONE ELECTRICAL CONDUCTOR THROUGH A METALLIC SHEATH

[75] Inventor: Helmut Swars, Bergisch Gladbach, Germany

[73] Assignee: Emitec Gesellschaft fuer Emissionstechnologie, Lohmar, Germany

[21] Appl. No.: 500,046

[22] Filed: Jul. 10, 1995

Related U.S. Application Data

[63] Continuation-in-part of PCT/EP94/00047 Jan. 10, 1994.

[30]  Foreign Application Priority Data

Feb. 8, 1993 [DE]  Germany ............... 43 03 581.7

[51] Int. Cl.[6] .................. H05B 3/08; F01N 3/10
[52] U.S. Cl. ............. 219/541; 219/553; 55/DIG. 30; 60/300; 422/222
[58] Field of Search ................. 219/552–553, 219/541; 392/485; 60/300; 55/DIG. 30; 422/211, 222; 439/34, 928

[56]  References Cited

U.S. PATENT DOCUMENTS

| | | | |
|---|---|---|---|
| 2,625,634 | 1/1953 | Temple | 219/541 |
| 3,768,982 | 10/1973 | Kitzner et al. | 60/300 |
| 4,362,016 | 12/1982 | Papadopulos | 422/174 |
| 5,140,813 | 8/1992 | Whittenberger | 60/300 |
| 5,146,743 | 9/1992 | Maus et al. | 60/300 |
| 5,238,650 | 8/1993 | Sheller et al. | 219/541 |
| 5,255,511 | 10/1993 | Maus et al. | 422/174 |
| 5,318,756 | 6/1994 | Sheller et al. | 219/541 |
| 5,355,671 | 10/1994 | Maus et al. | 60/274 |
| 5,411,711 | 5/1995 | Swars | 60/300 |
| 5,413,767 | 5/1995 | Breuer et al. | 422/22 |
| 5,433,926 | 7/1995 | Swars | 219/553 |

FOREIGN PATENT DOCUMENTS

| | | |
|---|---|---|
| 931356 | 7/1955 | Germany . |
| 1690413 | 6/1971 | Germany . |
| 3041613 | 6/1982 | Germany . |
| 8816514 | 12/1989 | Germany . |
| 358482 | 1/1962 | Switzerland . |
| 9202714 | 2/1992 | WIPO . |

Primary Examiner—Teresa J. Walberg
Assistant Examiner—Raphael Valencia
Attorney, Agent, or Firm—Herbert L. Lerner; Laurence A. Greenberg

[57] ABSTRACT

An exhaust gas system for an internal combustion engine, in particular an electrically heatable catalytic converter, includes a metallic sheath having tabs and at least one electrical conductor extending through the tabs. An electrically insulating, gas-tight leadthrough for the at least one electrical conductor in the vicinity of the tabs includes first and second successively disposed sections. The first section is closer to the exhaust gas system for electrical insulation and is resistant to temperatures up to 1300° C., but need not be completely gas-tight. The second section is farther from the exhaust gas system and is gas-tight and electrically insulating for temperatures up to 500° C.

30 Claims, 2 Drawing Sheets

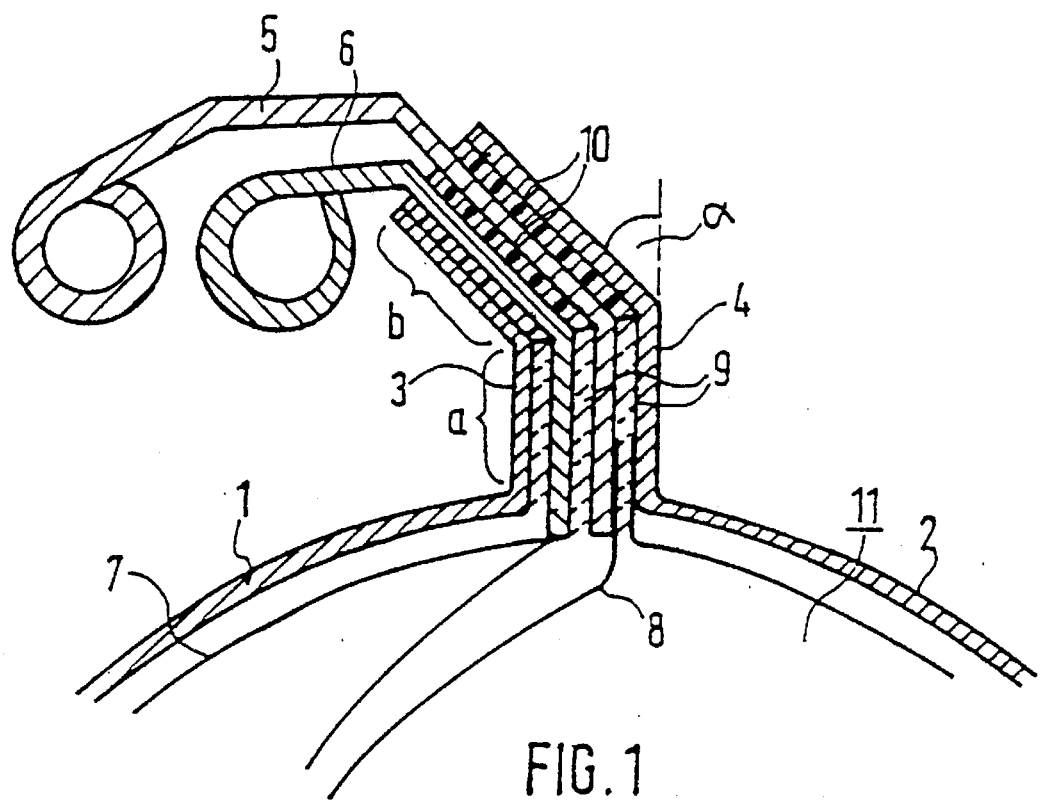
FIG. 1
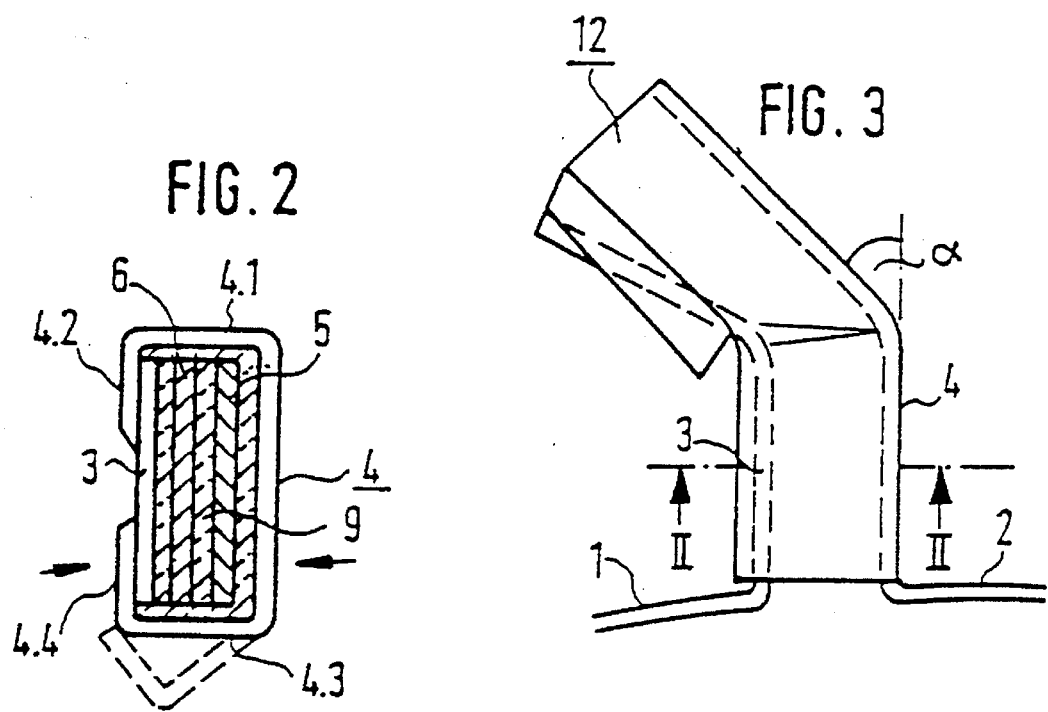
FIG. 2
FIG. 3

ELECTRICALLY INSULATING, GAS-TIGHT LEADTHROUGH FOR AT LEAST ONE ELECTRICAL CONDUCTOR THROUGH A METALLIC SHEATH

CROSS-REFERENCE TO RELATED APPLICATION

This application is a continuation-in-part of International application Ser. No. PCT/EP94/00047, filed Jan. 10, 1994.

BACKGROUND OF THE INVENTION

Field of the Invention

The present invention relates to an electrically insulating, gas-tight leadthrough for at least one electrical conductor extending through a metallic sheath of an exhaust gas system of an internal combustion engine, in particular an electrically heatable catalytic converter.

Electrically insulating, gas-tight leadthroughs are known in large numbers from the prior art. Such leadthroughs are available for the most varied purposes.

Increasingly more complex exhaust gas purification systems are employed because of increasingly stricter regulations for limiting noxious exhaust gases from motor vehicles. Besides a controlled three-way catalytic converter, electrically heatable catalytic converters are employed in particular for reducing pollutant emissions during a cold start phase of a motor vehicle. An electrically heatable honeycomb body which is suitable therefor is described in International Patent Application WO 92/02714, corresponding to U.S. Pat. No. 5,411,711. The present invention is based on that prior art and reference is made to the entire contents of that reference regarding details of the structure of electrically heatable honeycomb bodies in order to avoid repetitions. The problem connected with electrical leadthroughs in an exhaust gas system of a motor vehicle is that the leadthrough must be electrically insulating, mechanically stable, gas-tight and suitable for very high temperatures and great temperature variations. Besides an electrically insulating coating, for that purpose the prior art proposes sealing with an expanding material, for example of mica fibers. However, it is difficult to produce such seals which are actually completely gas-tight and have a long service life. In connection with exhaust gas installations having a controlled three-way catalytic converter in particular, it is important for exact control that the system be gas-tight, because otherwise the oxygen measurements performed in the interior can become distorted.

Problems of a comparable nature have basically been solved in the prior art long ago by metal-ceramic constructions, for example in connection with spark plugs. However, such compounds are elaborate in their production and therefore expensive.

However, in connection with electrically heatable catalytic converters there is an additional problem which is that they are generally produced in a brazing or sintering process, and the electrical insulation for the leadthrough should already be in place for simplifying production. That insulation therefore must resist the temperatures in the brazing or sintering process.

SUMMARY OF THE INVENTION

It is accordingly an object of the invention to provide an electrically insulating, gas-tight leadthrough for at least one electrical conductor through a metallic sheath, which overcomes the hereinafore-mentioned disadvantages of the heretofore-known devices of this general type, which is used in particular for conditions in exhaust gas systems of internal combustion engines and with electrically heatable catalytic converters, and which can be produced at advantageous cost and yet maintains its properties for an extended service life.

With the foregoing and other objects in view there is provided, in accordance with the invention, in an exhaust gas system for an internal combustion engine, in particular an electrically heatable catalytic converter, including a metallic sheath having tabs and at least one electrical conductor extending through the tabs, an electrically insulating, gas-tight leadthrough for the at least one electrical conductor in the vicinity of the tabs, comprising first and second successively disposed sections, the first section being closer to the exhaust gas system for electrical insulation and being resistant to temperatures up to 1300° C., but need not be completely gas-tight, and the second section being farther from the exhaust gas system and being gas-tight and electrically insulating for temperatures up to 500° C.

The invention is accordingly based on the realization that the temperatures maximally occurring in exhaust gas systems at metallic leadthroughs are already greatly decreased at a small distance, for example of one centimeter, outside of the exhaust gas system. It is therefore not a compelling requirement to provide all properties demanded from the leadthrough within a small range and with a single sealing and insulating material. Due to the division of the leadthrough into two sections with different functions it is possible to use materials which are cost-effectively available, without elaborate processing steps being required. In particular, it is possible to already apply the insulating material in the first section prior to a brazing and sintering process. In this way it is already used for the mechanically stable holding of the electrical conductor or conductors during production as well as later.

In accordance with another feature of the invention, there is provided a ceramic material, preferably pressed clay, being used as an electrical insulation material for the first section. This material provides a dependable assurance of an electrical insulation at high temperatures, but cannot provide a permanent seal.

In accordance with a further feature of the invention, there is provided an elastic-plastic material being used as the electrical insulation material in the second section, where there is already a considerably lower maximum temperature and the occurring variations are also considerably smaller, and which simultaneously has good sealing qualities over a long service life. The known materials being used for seals in exhaust gas systems or at cylinder head seals are suitable therefor. The second section can be produced without problems following a brazing or sintering process, so that it is not exposed to such high temperature stresses.

The combination of the two sections then provides all desired properties, namely a mechanically stable electrical insulation and gas-tightness under all operational conditions.

In accordance with an added feature of the invention, the leadthrough simultaneously contains two or more electrical conductors disposed next to each other, without the principle of the present invention being changed thereby.

In accordance with an additional feature of the invention, the leadthrough is suitable for electrical conductors which are intended to contain currents of 50 to 500 Amperes or even more. Such conductors need to have large cross sections, because of which considerably greater problems of different expansion at changing temperatures occur than is the case with spark plugs, for example. The present invention is particularly useful for electrical conductors with large conductor cross sections because of the use of an elastic-plastic material as a seal.

In accordance with yet another feature of the invention, in order to produce the leadthrough more simply and to assure the adhesion of the elastic-plastic material to the adjoining surfaces, the leadthrough is enclosed in a metal cap or a clamp which is shaped in such a way that it completely encloses at least the second section and presses it together. Although similar structures for a single section are known from the prior art, the division of the leadthrough into two sections offers additional structural options for the shape and fastening of the cap.

In accordance with yet a further feature of the invention, the tabs of the sheath between which the electrical conductor has been placed project beyond it and can be connected with each other in a gas-tight manner on the side of the conductor, preferably by brazing or welding. Therefore complete sealing is assured in this region.

In accordance with yet an added feature of the invention, the metal cap encloses the second section and the projecting tabs at least partially, so that it is possible to assure a complete sealing of the system. The cap can preferably be connected with the projecting tabs by brazing or welding. It is also possible for the cap to be a part of the projecting tabs by providing that they have lateral wings which can be bent together to form a cap.

In accordance with yet an additional feature of the invention, the second section is angled relative to the first section, preferably at an angle of 15° to 90° and in particular at an angle of approximately 45°.

In accordance with again another feature of the invention, there are provided electrically conducting structures being connected to the at least one conductor in the interior of the exhaust gas system, the at least one conductor having a larger cross section than the electrically conducting structures in the vicinity of the first and second sections.

Since exhaust systems in motor vehicles are generally disposed underneath the floor pan, the present invention also relates to the protected securing of cables to connections at the ends of the electric conductors. The ends of the electric conductors still become so hot during operation that finding a way in which to connect cables of low junction resistance with good durability of the connection it is a serious problem. Various aspects must be considered. If copper cables are used, they cannot be hard soldered or brazed to connections without difficulty, because that could make the copper brittle. Compaction, screw fastening or soft soldering or brazing are therefore primarily considered as connecting techniques in all of these cases. Corrosion problems must be taken into account, especially with soft soldered or brazed connections. The high temperatures that occur at the connections and the splashing water that typically occurs underneath motor vehicles, which is sometimes aggressive because of salt, readily causes harmful corrosion of various metals at the connecting points. One major aspect of the present invention is to provide a remedy therefor.

In accordance with again a further feature of the invention, there are provided connections at ends of the at least one electric conductor, electric cables connected to the connections, and a third sealing section enveloping the connections like a shell to protect against external factors, such as splashing water, corrosion, and so forth.

In accordance with again an added feature of the invention, the shell is filled up with a sealing material, such as sodium silicate, "TEFLON", (polytetrafluoroethylene) or other glass-like materials, which are placed in the shell in powder form, for instance, and can be melted by heating to form a dense composition.

In accordance with again an additional feature of the invention, since the third sealing section cannot be finished until the cables have been secured to the connections, the shell which forms the third sealing section includes two half-shells that can later be folded around one part of the first or second section of the leadthrough and around the connections. Before the shells are closed, their interior can be filled with a sealing composition.

In accordance with a concomitant feature of the invention, the at least one electric conductor includes a plurality of electric conductors having ends being differently constructed to make it mechanically impossible to make misconnections.

Other features which are considered as characteristic for the invention are set forth in the appended claims.

Although the invention is illustrated and described herein as embodied in an electrically insulating gas-tight leadthrough for at least one electrical conductor through a metallic sheath, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, cross-sectional view of a leadthrough of an electrically heatable honeycomb body;

FIG. 2 is a cross-sectional view taken along a line II—II of FIG. 3, in the direction of the arrows, and FIG. 3 is a lateral view, of an example of a structure of a metal cap folded around the leadthrough.

DESCRIPTION OF THE PREFERRED EMBODIMENTS

Figure 4:
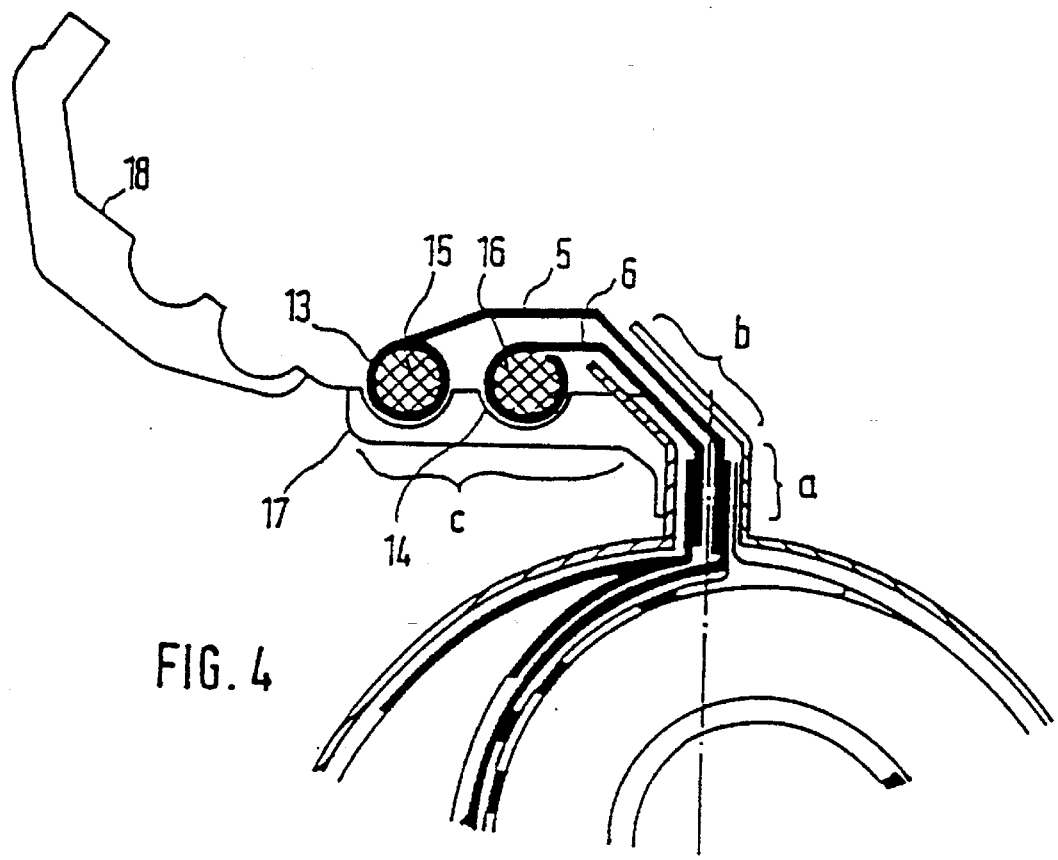
FIGS. 4 and 5 are fragmentary, cross-sectional views showing a structure of a third sealing section for protecting connections in a closed and in a folded-open state.

Referring now to the figures of the drawing in detail and first, particularly, to FIG. 1 thereof, there is seen a diagrammatically illustrated, interior structure of an electrically heatable honeycomb body 11 that is part of an exhaust gas system in which electrically conducting structures 7, 8 for introducing an electrical current are located. Reference is made to International Patent Application WO 92/0271, corresponding to U.S. Pat. No. 5,411,711, regarding the structure of such honeycomb bodies. The exhaust gas system is enclosed in a sheath or casing which can be produced from two half shells 1, 2, for example. The half shells 1, 2 have projecting tabs 3, 4 in the region of a leadthrough, between which electrical conductors 5, 6 that are constructed for high currents are passed to the outside. Connectors for supply lines of large cross section are generally provided on the outside on the electrical conductors 5, 6. The region of the leadthrough between the tabs 3, 4 is divided into first and second sections a, b, and a ceramic material 9, preferably clay, is provided as insulation between the tabs 3, 4 and the conductors 5, 6 in the first section a. A permanently elastic, plastic material 10, for example a material known from cylinder head seals, exhaust pipe seals at flanges, and the like, is used as insulating and sealing material between the electrical conductors 5, 6 and the tabs 3, 4 in the second section b which is located farther outward and is therefore only subjected to lesser maximum temperatures. The second section b can be bent in relation to the first section a by an angle α of 30° to 100°, particularly approximately 45°, which results in a space-saving construction. The electrical conductors 5, 6 can again be angled further out, so that altogether a compact configuration with protected connectors for supply lines is created.

The entire leadthrough can be enclosed by a cap that is not shown in FIG. 1 but which has a construction that is shown, for example, in FIGS. 2 and 3. This cap or clamp 12 can be folded around the leadthrough, in the course of which the plastic material 10 is pressed against the adjoining surfaces, which leads to a lasting seal. If necessary, the cap 12 can be welded together with the tabs 3, 4 in the first section a, but a solid fastening can also take place by folding or the like. It is even more advantageous if the cap 12 is formed on one of the half shells 1, 2 or on their projecting tabs 3, 4, as is illustrated in FIGS. 2 and 3.

As can be seen in FIG. 3, a formed cap 12 can also be made of two sections, wherein a first section can already be folded around the first section a of the leadthrough prior to a brazing or sintering process, as is seen in FIG. 2. Through the use of this structure the insulating material 9 is already fixed in place while the conductors 5, 6 and the tabs 3, 4 in the second section b are still spread open. The elastic-plastic material 10 is used there only after the brazing or sintering process and the cap 12 is closed and pressed together.

Then the section b has the same cross-sectional appearance as is shown for the section a in FIG. 2. The cap 12 (formed onto the tab 4) encloses the entire leadthrough with its lateral surfaces or flanks 4.1, 4.3 and end pieces 4.2, 4.4 and presses the parts together.

Figure 5:
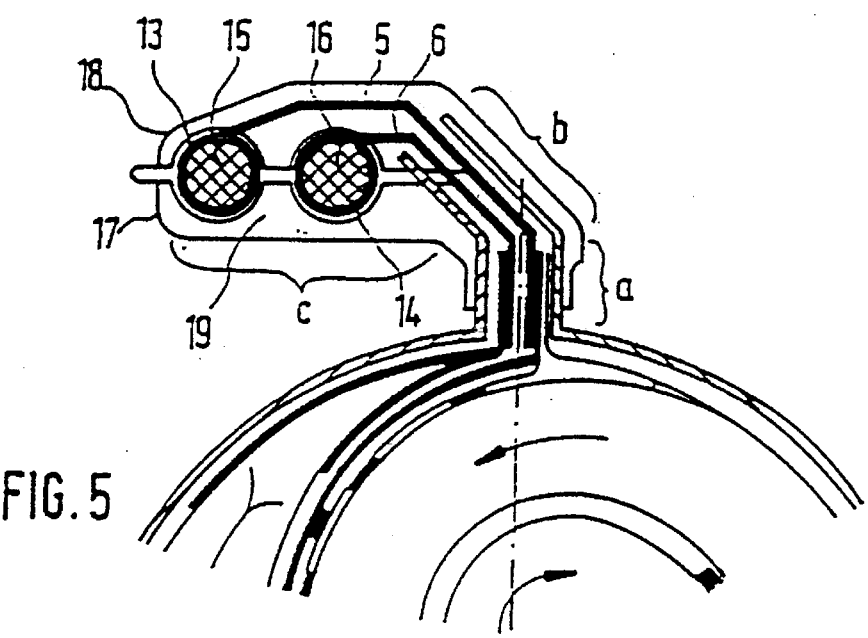

FIGS. 4 and 5 show a special embodiment of a third sealing section c, which protects connections 13, 14 of the electric conductors 5, 6 against external factors. The third sealing section c is formed by a shell made up of two half-shells 17, 18, which encompass the connections 13, 14 and cables 15, 16 secured thereto, and which is filled with a sealing composition 19, preferably sodium silicate or similar materials that can be melted to make a solid composition.

The half-shells 17, 18 enclose not only the connections but also parts of the other sealing sections a, b, so that overall the result is that the leadthrough and the connections are tightly protected against splashing water and similar factors.

The present invention is particularly suited for the cost-effective production of electrical leadthroughs on heatable catalytic converters which are charged with currents between 50 and 500 Amperes. The invention is readily applicable as well for connecting sensors or the like, which are to be secured in exhaust systems or catalytic converters.

I claim:

1. In combination with an exhaust gas system for an internal combustion engine including a metallic sheath having tabs and at least one electrical conductor extending through the tabs, an electrically insulating, gas-tight leadthrough for the at least one electrical conductor in vicinity of the tabs, comprising:

first and second successively disposed sections formed of mutually different materials, said first section being closer to the exhaust gas system for electrical insulation and being resistant to temperatures up to 1300° C., and said second section being farther from the exhaust gas system and being gas-tight and electrically insulating for temperatures up to 500° C.

2. The leadthrough according to claim 1, wherein said first section is not completely gas-tight.

3. The leadthrough according to claim 1, wherein said first section is completely gas-tight.

4. The leadthrough according to claim 1, including a ceramic material disposed in said first section as insulating material.

5. The leadthrough according to claim 4, wherein said ceramic material is pressed clay.

6. The leadthrough according to claim 1, including an elastic-plastic material disposed in said second section as insulating and sealing material.

7. The leadthrough according to claim 6, wherein said elastic-plastic material is a material being suitable for engine and exhaust gas seals.

8. The leadthrough according to claim 1, wherein the at least one electrical conductor includes two electrical conductors being passed next to each other through the sheath.

9. The leadthrough according to claim 1, wherein each electrical conductor is constructed for current intensities of from 50 to 500 Amperes.

10. The leadthrough according to claim 1, including a metal cap enclosing said first and second sections and enclosing and pressing together at least said second section.

11. The leadthrough according to claim 1, wherein the tabs project and are laterally gas-tightly connected with each other at least over the length of said first section.

12. The leadthrough according to claim 11, wherein the tabs are brazed.

13. The leadthrough according to claim 11, wherein the tabs are welded.

14. The leadthrough according to claim 10, wherein said metal cap at least partially gas-tightly encloses the projecting tabs and is connected with the tabs by brazing.

15. The leadthrough according to claim 10, wherein said metal cap at least partially gas-tightly encloses the projecting tabs and is connected with the tabs by welding.

16. The leadthrough according to claim 10, wherein said metal cap at least partially gas-tightly encloses the projecting tabs and is formed on the tabs.

17. The leadthrough according to claim 1, wherein said second section is angled relative to said first section.

18. The leadthrough according to claim 1, wherein said second section is angled relative to said first section at an angle of 15° to 90°.

19. The leadthrough according to claim 1, wherein said second section is angled relative to said first section at an angle of approximately 45°.

20. The leadthrough according to claim 1, including electrically conducting structures being connected to the at least one conductor in the interior of the exhaust gas system, said at least one conductor having a larger cross section than said electrically conducting structures in vicinity of said first and second sections.

21. The leadthrough according to claim 1, including connections at ends of said at least one electric conductor, electric cables connected to said connections, and a third sealing section including a shell enveloping said connections to protect against external factors.

22. The leadthrough according to claim 21, wherein said shell is filled with sealing material.

23. The leadthrough according to claim 22, wherein said shell has two half-shells sealingly enveloping said connections and at least a portion of at least one of said first and second sections.

24. The leadthrough according to claim 22, wherein said sealing material filling up said shell is electrically insulating and resistant to temperatures of from 200° to 500° C.

25. The leadthrough according to claim 24, wherein said sealing material is selected from the group consisting of sodium silicate, polytetrafluoroethylene, and glass.

26. The leadthrough according to claim 1, wherein the at least one electric conductor includes a plurality of electric conductors having ends being differently constructed to make it mechanically impossible to make misconnections.

27. In combination with an electrically heatable catalytic converter for an internal combustion engine including a metallic sheath having tabs and at least one electrical conductor extending through the tabs, an electrically insulating, gas-tight leadthrough for the at least one electrical conductor in vicinity of the tabs, comprising:

first and second successively disposed sections formed of mutually different materials, said first section being closer to the exhaust gas system for electrical insulation and being resistant to temperatures up to 1300° C., and said second section being farther from the exhaust gas system and being gas-tight and electrically insulating for temperatures up to 500° C.

28. The leadthrough according to claim 27, wherein said first section is not completely gas-tight.

29. The leadthrough according to claim 27, wherein said first section is completely gas-tight.

30. The leadthrough according to claim 1, including a metal clamp enclosing said first and second sections and enclosing and pressing together at least said second section.

* * * * *